(12) United States Patent
Fukuda et al.

(10) Patent No.: US 8,492,478 B2
(45) Date of Patent: Jul. 23, 2013

(54) CURABLE PERFLUOROPOLYETHER GEL COMPOSITION AND GEL PRODUCT PRODUCED BY USING CURED PERFLUOROPOLYETHER GEL COMPOSITION

(75) Inventors: Kenichi Fukuda, Annaka (JP); Noriyuki Koike, Annaka (JP); Mikio Shiono, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 142 days.

(21) Appl. No.: 13/180,966

(22) Filed: Jul. 12, 2011

(65) Prior Publication Data

US 2012/0016081 A1    Jan. 19, 2012

(30) Foreign Application Priority Data

Jul. 14, 2010    (JP) .................. 2010-159359

(51) Int. Cl.

| | | |
|---|---|---|
| C08F 290/14 | (2006.01) | |
| C08F 283/00 | (2006.01) | |
| A61K 9/70 | (2006.01) | |
| B60C 1/00 | (2006.01) | |
| C08G 18/77 | (2006.01) | |
| C08K 5/24 | (2006.01) | |

(52) U.S. Cl.
USPC ............. 525/50; 525/479; 525/115; 524/266; 524/261; 524/263; 428/427

(58) Field of Classification Search
USPC ............ 525/479, 115; 524/266, 263; 428/447
See application file for complete search history.

(56) References Cited

U.S. PATENT DOCUMENTS

| | | | |
|---|---|---|---|
| 5,665,846 A | 9/1997 | Sato et al. | |
| 6,040,400 A | 3/2000 | Fukuda et al. | |
| 8,299,196 B2 * | 10/2012 | Shiono et al. ................ | 528/15 |
| 2003/0162038 A1 | 8/2003 | Fukuda et al. | |
| 2006/0178459 A1 | 8/2006 | Matsuda et al. | |
| 2006/0183859 A1 | 8/2006 | Fukuda et al. | |
| 2008/0293859 A1 | 11/2008 | Yamaguchi et al. | |
| 2011/0257315 A1 | 10/2011 | Shiono et al. | |

FOREIGN PATENT DOCUMENTS

| | | |
|---|---|---|
| EP | 1 033 387 A2 | 9/2000 |
| EP | 1 327 667 A2 | 7/2003 |
| EP | 1 327 667 A3 | 7/2003 |
| EP | 1 616 895 A1 | 1/2006 |
| EP | 1 693 398 A1 | 8/2006 |
| EP | 1 995 278 A1 | 11/2008 |
| EP | 2 383 318 A1 | 11/2011 |
| JP | 2990646 | 10/1999 |
| JP | 2000-248166 | 9/2000 |
| JP | 3487744 | 10/2003 |

OTHER PUBLICATIONS

Extended Search Report issued Dec. 2, 2011 in Europe Application No. 11173795.3.

* cited by examiner

*Primary Examiner* — Randy Gulakowski
*Assistant Examiner* — Christopher M Rodd
(74) *Attorney, Agent, or Firm* — Oblon, Spivak, McClelland, Maier & Neustadt, L.L.P.

(57) ABSTRACT

A curable perfluoropolyether gel composition is provided. The composition comprises (A) a straight chain fluorine-containing polymer represented by the following formula (1):

$$CH_2=CH-\underset{R^1R^3}{\underset{|}{\overset{R^1}{\overset{|}{Si}}}}-R^2-N-\overset{O}{\overset{\|}{C}}-Rf^1-\overset{O}{\overset{\|}{C}}-N-R^2-\underset{R^3R^1}{\underset{|}{\overset{R^1}{\overset{|}{Si}}}}-CH=CH_2, \quad (1)$$

(with aromatic substituents bearing $R^3$ groups on both nitrogen atoms)

(B) a polyfluoromonoalkenyl compound containing one alkenyl group per molecule and having a perfluoropolyether structure in its backbone, (C) an organosilicon compound containing at least two hydrogen atoms bonded to the silicon atom per molecule, and (D) a hydrosilylation catalyst. The composition can be produced into a cured product having excellent heat resistance, solvent resistance, chemical resistance, weatherability, releasability, water repellency, oil repellency, and the like as well as an improved acid resistance.

17 Claims, No Drawings

CURABLE PERFLUOROPOLYETHER GEL COMPOSITION AND GEL PRODUCT PRODUCED BY USING CURED PERFLUOROPOLYETHER GEL COMPOSITION

CROSS-REFERENCE TO RELATED APPLICATION

This non-provisional application claims priority under 35 U.S.C. §119(a) on patent application Ser. No. 2010-159359 filed in Japan on Jul. 14, 2010, the entire contents of which are hereby incorporated by reference.

TECHNICAL FIELD

This invention relates to a perfluoropolyether gel composition capable of producing a cured gel composition having improved heat resistance, solvent resistance, and chemical resistance, and in particular, a cured gel composition having an improved acid resistance. This invention also relates to a gel product produced by using the cured gel composition.

BACKGROUND ART

JP 3487744 (Patent Document 1) discloses that a cured gel product having well balanced heat resistance, chemical resistance, solvent resistance, water repellency, oil repellency, weatherability, and the like can be produced by curing a composition containing a straight chain perfluoropolyether compound having at least two alkenyl groups per molecule and including a perfluoropolyether structure in its backbone; a straight chain perfluoropolyether compound having one alkenyl group per molecule and including a perfluoropolyether structure in its backbone; an organosilicon compound having at least two hydrosilyl groups per molecule; and a hydrosilylation catalyst.

Such perfluoropolyether gel composition has sufficient performance for almost all applications. However, higher acid resistance may be required in the applications where chemical resistance is required, for example, in the applications such as a sealant for semiconductor production system, a sealant and potting agent for engine oils, and a sealant and potting agent for engine exhaust parts. Accordingly, there is a strong demand for a perfluoropolyether gel composition having excellent oil resistance and chemical resistance, and in particular, an excellent acid resistance.

Prior art documents relevant with the present invention include those as described below.

Of these, the polymer having an [aromatic ring—Si atom—vinyl group] structure at its terminal described in Japanese Patent 2990646 is known to have an excellent rapid curability due to the presence of the [Si atom—vinyl group] structure while this polymer is inferior in the acid resistance due to the presence of the binding site between the aromatic ring and the Si atom. On the other hand, polymers having no [aromatic ring—Si atom—vinyl group] structure on its terminal (for example, a polymer having an [aromatic ring—alkylene group—vinyl group] structure on its terminal or a polymer having an [amide group having an aromatic ring substituent in the side chain—alkylene group—vinyl group] structure on its terminal) have excellent acid resistance while these polymers suffered from inferior rapid curability.

CITATION LIST

Patent Document 1: JP 3487744
Patent Document 2: JP 2990646
Patent Document 3: JP-A 2000-248166

SUMMARY OF THE INVENTION

The present invention has been completed to correspond to the situation as described above, and an object of the present invention is to provide a perfluoropolyether gel composition capable of producing a cured composition having improved heat resistance, solvent resistance, chemical resistance, weatherability, releasability, water repellency, and oil repellency, and in particular, an excellent acid resistance. Another object of the present invention is to provide a gel product produced by using the cured gel composition.

The inventors of the present invention made an intensive study to obviate the defects of the conventional perfluoropolyether gel compositions as described above, and found that a curable perfluoropolyether gel composition comprising (A) a straight chain fluorine-containing polymer having at least two alkenyl groups per molecule, represented by the following formula (1):

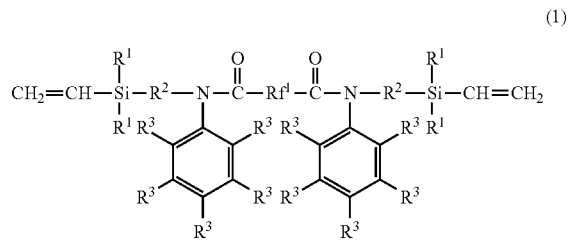

wherein $R^1$ is independently vinyl group or an alkyl group containing 1 to 4 carbon atoms, $R^2$ is an alkylene group containing 1 to 6 carbon atoms, $R^3$ is independently hydrogen atom or an alkyl group containing 1 to 4 carbon atoms optionally substituted with fluorine, and $Rf^1$ is a perfluoroalkylene group or a divalent perfluoropolyether structure-containing group, (B) a polyfluoromonoalkenyl compound containing one alkenyl group per molecule and having a perfluoropolyether structure in its backbone, (C) an organosilicon compound containing at least two hydrogen atoms bonded to the silicon atom per molecule, and (D) a hydrosilylation catalyst is capable of realizing the objects as described above. The present invention has been completed on the basis of such finding.

Accordingly, the present invention provides the curable perfluoropolyether gel composition and the gel product produced by using cured perfluoropolyether gel composition as described below.

[1] A curable perfluoropolyether gel composition comprising
(A) a straight chain fluorine-containing polymer having at least two alkenyl groups per molecule, represented by the following formula (1):

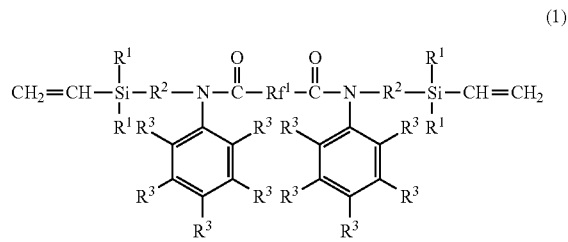

wherein $R^1$ is independently vinyl group or an alkyl group containing 1 to 4 carbon atoms, $R^2$ is an alkylene group containing 1 to 6 carbon atoms, $R^3$ is independently hydrogen atom or an alkyl group containing 1 to 4 carbon atoms optionally substituted with fluorine, and $Rf^1$ is a perfluoroalkylene group or a divalent perfluoropolyether structure-containing group, (B) a polyfluoromonoalkenyl compound containing one alkenyl group per molecule and having a perfluoropolyether structure in its backbone, (C) an organosilicon compound containing at least two hydrogen atoms bonded to the silicon atom per molecule, and (D) a hydrosilylation catalyst.

[2] A curable perfluoropolyether gel composition according to the above [1] further comprising (E) a at least one perfluoropolyether compound selected from the group consisting of the compounds represented by the following general formulae (2) to (4):

$$\text{A-O---(CF}_2\text{CF}_2\text{CF}_2\text{O)}_d\text{-A} \qquad (2)$$

wherein A is a group represented by the formula: $C_eF_{2e+1}$— wherein e is an integer of 1 to 3, and d is an integer of 1 to 500;

$$\text{A-O---(CF}_2\text{O)}_f\text{---(CF}_2\text{CF}_2\text{O)}_h\text{-A} \qquad (3)$$

wherein A is as described above, and f and h are independently an integer of 1 to 300, and

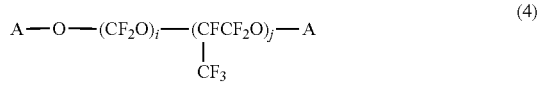

$$\text{A---O---(CF}_2\text{O)}_i\text{---(CFCF}_2\text{O)}_j\text{---A} \atop {\phantom{xxxxxxxxxxxxxx}|\atop \phantom{xxxxxxxxxxxx}\text{CF}_3} \qquad (4)$$

wherein A is as described above, and i and j are independently an integer of 1 to 300.

[3] A curable perfluoropolyether gel composition according to [1] or [2] wherein a penetration of a cured product of the gel composition according to JIS K2220 or ASTM D-1403 is in the range of 1 to 200.

[4] A curable perfluoropolyether gel composition according to any one of [1] to [3] wherein an amount of a cured product of the gel composition remaining in solid state after immersing in conc. sulfuric acid (98%) at 40° C. for 1,000 hours is at least 90%.

[5] A gel product containing a cured product of the curable perfluoropolyether gel composition of any one of the above [1] to [4].

[6] A gel product according to the above [5] wherein the product is adapted for use in automobiles, chemical plants, ink jet printers, semiconductor production lines, physical and chemical analysis equipment, medical equipment, aircrafts, or fuel cell production.

ADVANTAGEOUS EFFECTS OF THE INVENTION

The present invention provides a perfluoropolyether gel composition which can be produced into a cured product having excellent heat resistance, solvent resistance, chemical resistance, weatherability, releasability, water repellency, oil repellency, and the like as well as an improved acid resistance. The gel product produced by using the cured product of such composition is well adapted for use as a material in automobiles, chemical plants, ink jet printers, semiconductor production lines, analytical, physical, and chemical apparatus, medical instrument, aircrafts, fuel cells, and the like.

DESCRIPTION OF THE EMBODIMENTS

The curable perfluoropolyether gel composition of the present invention comprises (A) a straight chain fluorine-containing polymer having at least two alkenyl groups per molecule, represented by the following formula (1):

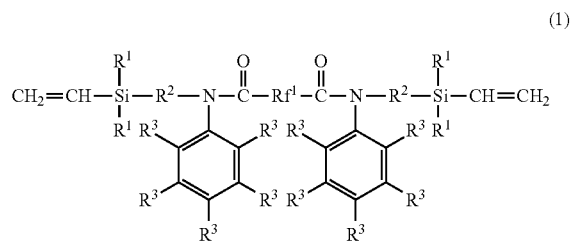

(1)

wherein $R^1$ is independently vinyl group or an alkyl group containing 1 to 4 carbon atoms, $R^2$ is an alkylene group containing 1 to 6 carbon atoms, $R^3$ is independently hydrogen atom or an alkyl group containing 1 to 4 carbon atoms optionally substituted with fluorine, and $Rf^1$ is a perfluoroalkylene group or a divalent perfluoropolyether structure-containing group, (B) a polyfluoromonoalkenyl compound containing one alkenyl group per molecule and having a perfluoropolyether structure in its backbone, (C) an organosilicon compound containing at least two hydrogen atoms bonded to the silicon atom per molecule, and (D) a hydrosilylation catalyst.

Component (A)

Component (A) of the present invention is a straight chain fluorine-containing polymer having at least two alkenyl groups per molecule, represented by the following formula (1):

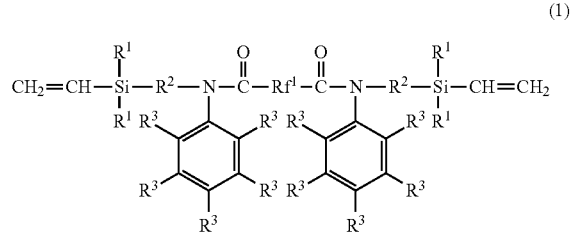

(1)

wherein $R^1$ is independently vinyl group or an alkyl group containing 1 to 4 carbon atoms, $R^2$ is an alkylene group containing 1 to 6 carbon atoms, $R^3$ is independently hydrogen atom or an alkyl group containing 1 to 4 carbon atoms optionally substituted with fluorine, and $Rf^1$ is a perfluoroalkylene group or a divalent perfluoropolyether structure-containing group.

In the formula (1), $R^1$ is independently vinyl group or an alkyl group containing 1 to 4 carbon atoms. Examples of the alkyl group containing 1 to 4 carbon atoms include methyl group, ethyl group, propyl group, and butyl group, and $R^1$ is preferably vinyl group or methyl group. $R^2$ is an alkylene group containing 1 to 6, and preferably 3 to 6 carbon atoms. Exemplary $R^2$ include methylene group, ethylene group, propylene group (trimethylene group or methylethylene group), butylene group (tetramethylene group or methylpropylene group), and hexamethylene group, and $R^2$ is preferably ethylene group or trimethylene group. $R^3$ is independently hydrogen atom or an alkyl group containing 1 to 4 carbon atoms optionally substituted with fluorine. Exemplary alkyl groups containing 1 to 4 carbon atoms include those as mentioned above for $R^1$. $Rf^1$ is a perfluoroalkylene group or a divalent perfluoropolyether structure-containing group.

Examples of the divalent perfluoropolyether structure-containing group include a straight chain or branched perfluoroalkylene group containing about 2 to 10, and preferably about 2 to 6 carbon atoms. The perfluoropolyether structure-containing group is the one containing a number of constitutional repeating units represented by the following formula:

—$C_gF_{2g}$O— wherein g is an integer of 1 to 6, such as the one represented by the following formula (5):

—($C_gF_{2g}$O)$_q$—    (5)

wherein g is an integer of 1 to 6, q is an integer of 20 to 600, preferably 30 to 400, and most preferably 30 to 200.

Examples of the constitutional repeating unit represented by the formula —$C_gF_{2g}$O— include those represented by the following formulae:

—$CF_2$O—,

—$CF_2CF_2$O—,

—$CF_2CF_2CF_2$O—,

—$CF(CF_3)CF_2$O—,

—$CF_2CF_2CF_2CF_2$O—,

—$CF_2CF_2CF_2CF_2CF_2CF_2$O—, and

—$C(CF_3)_2$O—.

Of these, preferable units are those represented by the following formulae:

—$CF_2$O—,

—$CF_2CF_2$O—,

—$CF_2CF_2CF_2$O—, and

—$CF(CF_3)CF_2$O—.

The divalent perfluoropolyether structure-containing group may comprise one type of constitutional repeating unit or a combination of two or more such constitutional repeating units.

The divalent perfluoropolyether structure-containing group may preferably comprise a structure selected from the group consisting of the units represented by the following formulae (6) to (8):

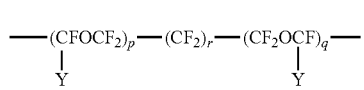    (6)

wherein Y is fluorine atom or trifluoromethyl group, p, q, and r are independently an integer of $p \geq 0$, $q \geq 0$, $0 \leq p+q \leq 200$ and most preferably $2 \leq p+q \leq 150$, and $0 \leq r \leq 6$ excluding the case of p=q=r=0;

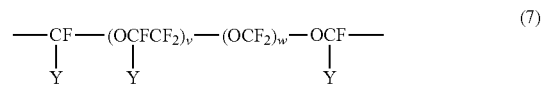    (7)

wherein Y is fluorine atom or trifluoromethyl group, and v and w are independently an integer of $1 \leq v \leq 20$ and $1 \leq w \leq 20$; and —$CF_2CF_2$—($OCF_2CF_2CF_2$)$_z$—$OCF_2CF_2$—    (8)

wherein z is an integer of $1 \leq z \leq 100$.

In the formula (1), examples of $Rf^1$ include those represented by the following formulae:

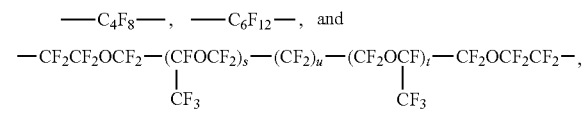

wherein s, t, and u are independently an integer of $s \geq 0$, $t \geq 0$, and $0 \leq s+t \leq 200$, and most preferably $2 \leq s+t \leq 150$, and $0 \leq u \leq 6$,

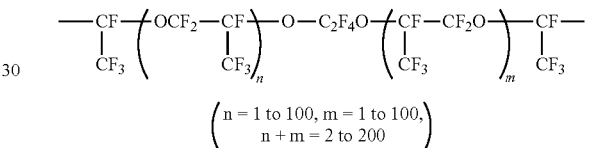

(n = 1 to 100, m = 1 to 100, n + m = 2 to 200)

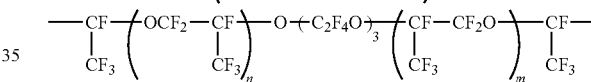

(n = 1 to 100, m = 1 to 100, n + m = 2 to 200)

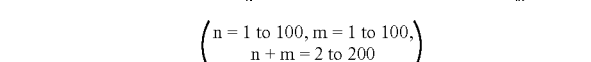

(n = 1 to 100, m = 1 to 100, n + m = 2 to 200)

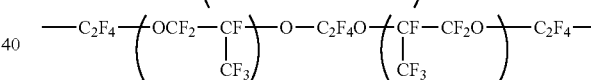

(n = 2 to 200)

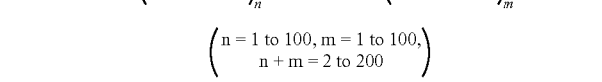

(n = 1 to 100, m = 1 to 100, n + m = 2 to 200)

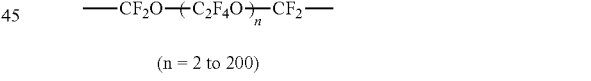

(n = 1 to 100, m = 1 to 100, n + m = 2 to 200)

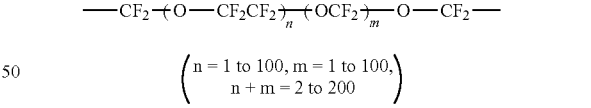

(n = 1 to 200)

wherein m, n, and m+n are independently an integer as defined above.

Preferable examples of the straight chain fluorine-containing polymer represented by the general formula (1) include those represented by the following formulae:

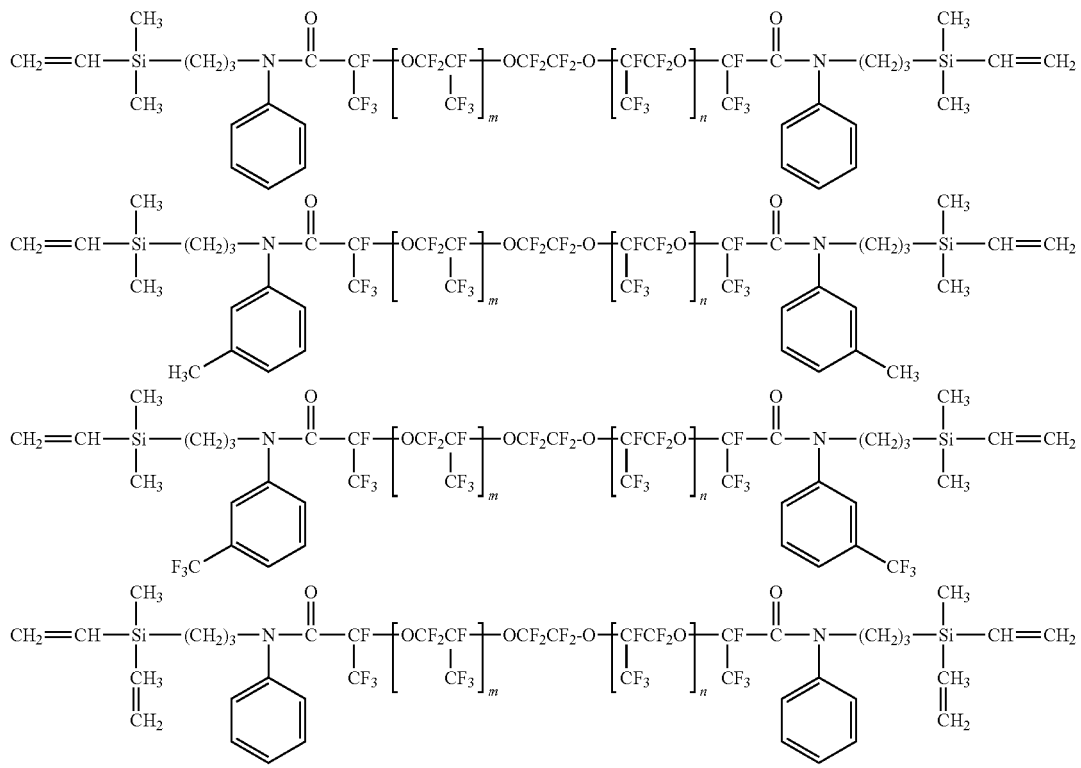

wherein m is 1 to 100, n is 1 to 100, and m+n is 2 to 200.

The straight chain fluorine-containing polymer of the formula (1) may preferably have a weight average molecular weight of 10,000 to 100,000, and more preferably 10,000 to 50,000 as measured by gel permeation chromatography (GPC) in terms of polystyrene. When the molecular weight is less than 10,000, the composition may exhibit an unduly high swelling by gasoline and various other solvents, and to be more specific, a member exhibiting the swelling by gasoline in excess of 6% may not fully serve a member required to have a gasoline resistance. A molecular weight in excess of 100,000 may result in high viscosity, and hence, in inferior workability.

In the present invention, the straight chain perfluoropolyether compound as described above which has been hydrosilylated with an organosilicon compound having two hydrosilyl groups (SiH groups) in the molecule by the method and conditions commonly used in the art to thereby extend the chain length may be used for the component (A) in order to impart the straight chain fluorine-containing polymer of the formula (1) with the desired weight average molecular weight adequate for the intended use.

The straight chain fluorine-containing polymer of the component (A) may comprise one such polymer or a combination of two or more such polymers.

Component (B)

Component (B) is a polyfluoromonoalkenyl compound containing one alkenyl group per molecule and having a perfluoropolyether structure in its backbone. More specifically, the polyfluoromonoalkenyl compound is preferably a compound represented by the following formula (9):

$$Rf^2—(X')_p—CH=CH_2 \qquad (9)$$

wherein

X' is —$CH_2$—, —$OCH_2$—, —$CH_2OCH_2$—, or —CO—$NR^4$—Y'— wherein Y' is —$CH_2$—, a group (o-, m- or p-dimethylsilylphenylene group) represented by the following structural formula (Z'):

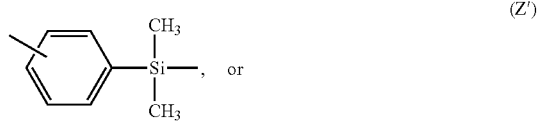

a group represented by the following structural formula (Z"):

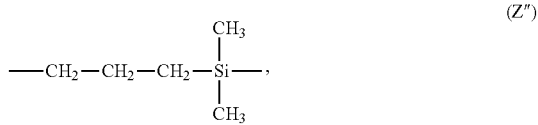

$R^4$ is hydrogen atom, methyl group, phenyl group, or allyl group;

$Rf^2$ is a monovalent perfluoropolyether structure-containing group which is preferably the group represented by the following formula:

$$(C_aF_{2a}O)_q—$$

wherein a is an integer of 1 to 6, and q is an integer of 20 to 600, preferably 30 to 400, and most preferably 30 to 200; and p is 0 or 1.

In the formula (9), $Rf^2$ may be, for example, the group represented by the following formulae:

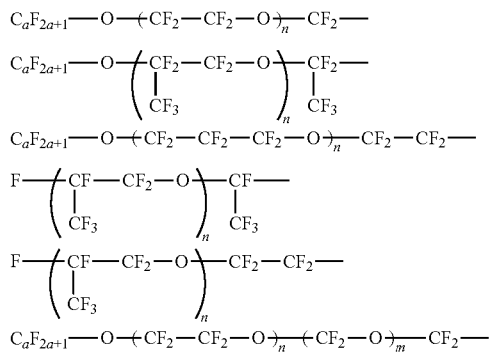

wherein a is an integer of 1 to 8, and n is an integer of $0 \leq n \leq 100$.

Exemplary polyfluoromonoalkenyl compounds represented by the general formula (9) include:

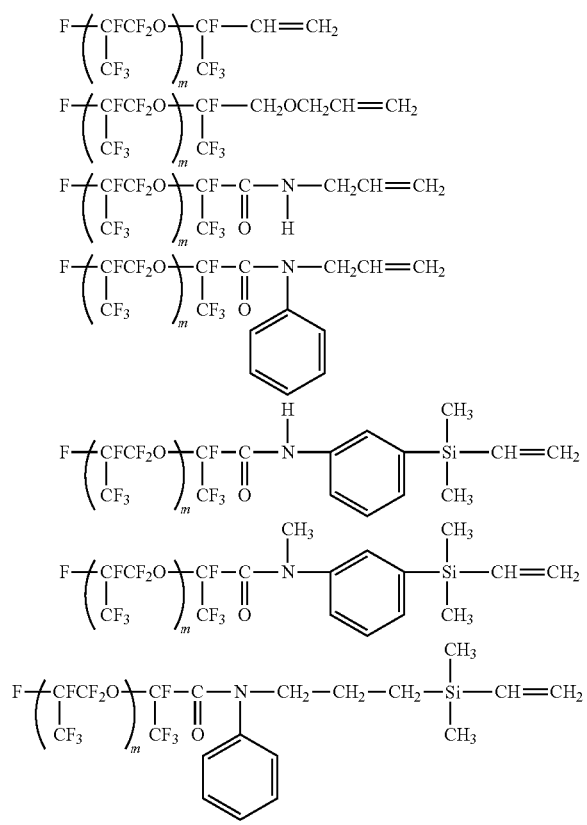

wherein m=1 to 100.

The polyfluoromonoalkenyl compound of the formula (9) is preferably incorporated in the curable perfluoropolyether gel composition of the present invention at 1 to 300 parts by weight, and more preferably 1 to 150 parts by weight per 100 parts by weight of the straight chain fluorine-containing polymer of the component (A). When the component (A) is used at less than 1 part by weight, crosslinking density after the curing will be too high to give a cured gel composition, and the resulting product may be a rubber composition. When used at a content in excess of 300 parts by weight, crosslinking density after the curing may be too low to give a cured gel composition, and the resulting product may be a liquid composition.

Component (C)

Component (C) is an organosilicon compound containing at least two hydrogen atoms bonded to the silicon atom (namely, hydrosilyl group represented by SiH) per molecule, and this organosilicon compound functions as a chain extender or a crosslinking agent for the component (A). In view of compatibility, dispersibility, and homogeneity after curing with the component (A) and/or the component (B), the preferred is use of the one containing at least one monovalent or divalent fluorine-containing organic group (for example, a monovalent fluorine-containing organic group such as a perfluoroalkyl group or a monovalent perfluoropolyether structure-containing group or a divalent fluorine-containing organic group such as a perfluoroalkylene group or a divalent perfluoropolyether structure-containing group) per molecule.

Examples of the monovalent fluorine-containing organic group include those represented by the following formulae:

wherein a is an integer of 1 to 10, and preferably 2 to 8, and

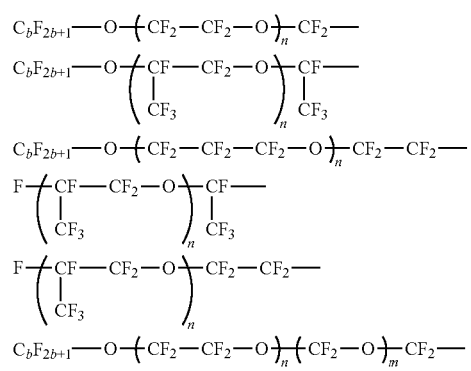

wherein b is an integer of 1 to 6, n and m are independently an integer of $0 \leq m \leq 100$, $0 \leq n \leq 100$, and $0 \leq m+n \leq 100$.

Examples of the divalent fluorine-containing organic group include those represented by the following formulae:

wherein g is an integer of 1 to 10, and preferably 2 to 8,

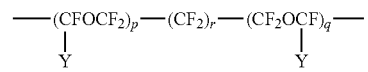

wherein Y is fluorine atom or trifluoromethyl group, p, q, and r are independently an integer of $p \geq 0$, $q \geq 0$, and $0 \leq p+q \leq 600$, and most preferably $2 \leq p+q \leq 200$ and $0 \leq r \leq 6$ with the proviso that r, p, and q are not r=p=q=0,

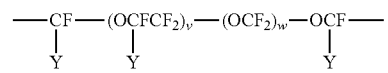

wherein Y is fluorine atom or trifluoromethyl group, v and w are independently an integer of $0 \leq v \leq 300$ and $0 \leq w \leq 300$ with the proviso that $1 \leq v+w \leq 600$, and

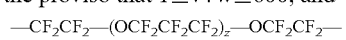

wherein z is an integer of $1 \leq z \leq 600$.

The monovalent or divalent fluorine-containing organic group may be bonded to the silicon atom either directly or via a divalent linking group. The divalent linking group may be an alkylene group, an arylene group a combination thereof, or any of these including oxygen atom of ether bond, amide bond, or carbonyl bond. The divalent linking group is preferably the one containing 2 to 12 carbon atoms, and examples include the groups represented by the following formulae:

—CH$_2$CH$_2$—,

—CH$_2$CH$_2$CH$_2$—,

—CH$_2$CH$_2$CH$_2$—O—CH$_2$—,

—CH$_2$CH$_2$CH$_2$—NH—CO—,

—CH$_2$CH$_2$CH$_2$—N(Ph)-CO—,

—CH$_2$CH$_2$CH$_2$—N(CH$_3$)—CO—, and

—CH$_2$CH$_2$CH$_2$—O—CO—, wherein Ph is phenyl group.

Examples of the monovalent organic group bonded to the silicon atom in the organosilicon compound of the component (C) other than the monovalent or divalent fluorine-containing organic group include alkyl groups such as methyl group, ethyl group, propyl group, butyl group, hexyl group, cyclohexyl group, octyl group, and decyl group, aryl groups such as phenyl group, tolyl group, and naphthyl group, aralkyl groups such as benzyl group, phenylethyl group, optionally substituted hydrocarbon groups containing 1 to 20 carbon atoms having some of the hydrogen atoms substituted with chlorine atom, cyano group, or the like such as chloromethyl group, chloropropyl group, and cyanoethyl group.

The organosilicon compound of the component (C) may be a straight chain, branched, or cyclic organosilicon compound, and the fluorine-containing organosilicon compound may typically contain 2 to about 60 carbon atoms, and preferably 3 to about 30 carbon atoms in the compound although the number of silicon atoms is not particularly limited.

Examples of such organosilicon compound include the organosilicon compounds having a siloxane structure and/or a silalkylene structure represented by the following formulae wherein a, b, m, n, and m+n are independently an integer as defined below each formula. These compounds may be used alone or in combination of two or more.

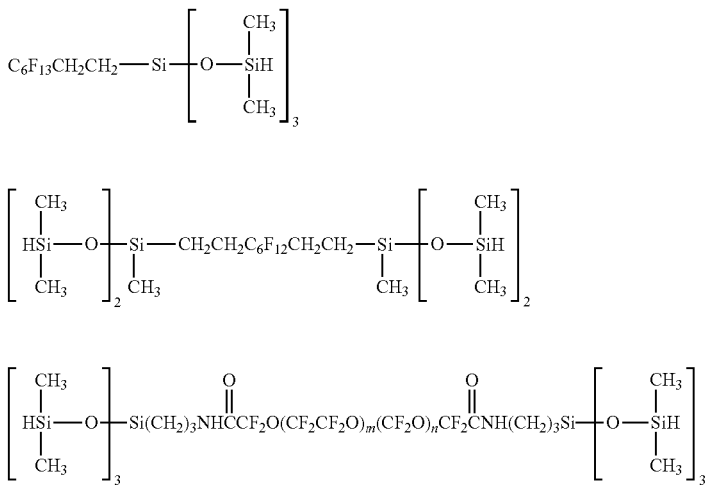

(n is 1 to 100, and preferably 1 to 50, m is 1 to 100, and preferably 1 to 50, and n+m is 2 to 200, and preferably 2 to 100),

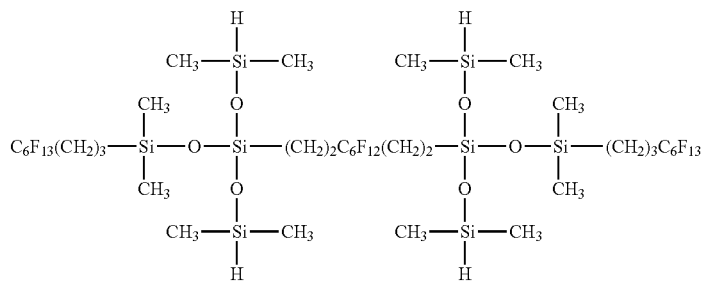

-continued
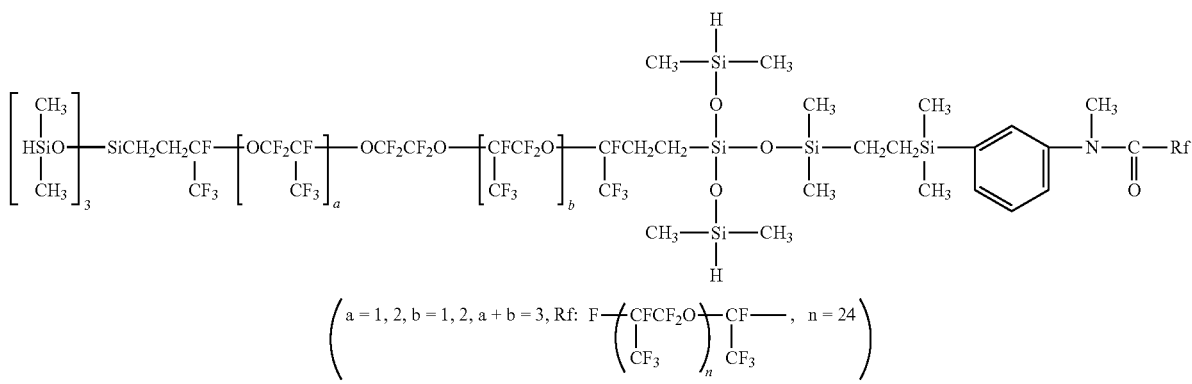
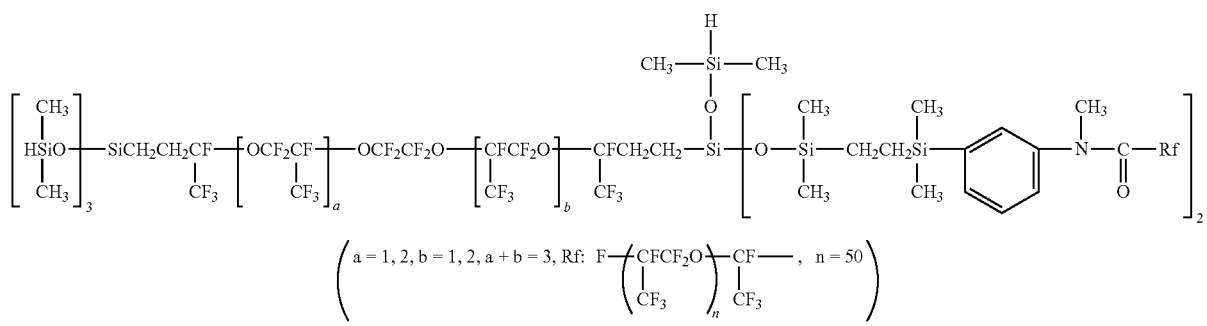
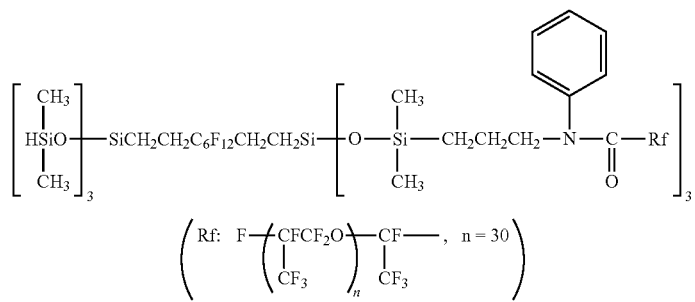
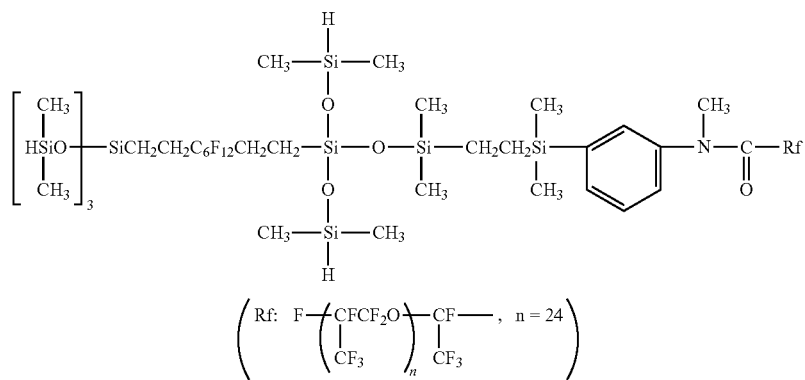

-continued
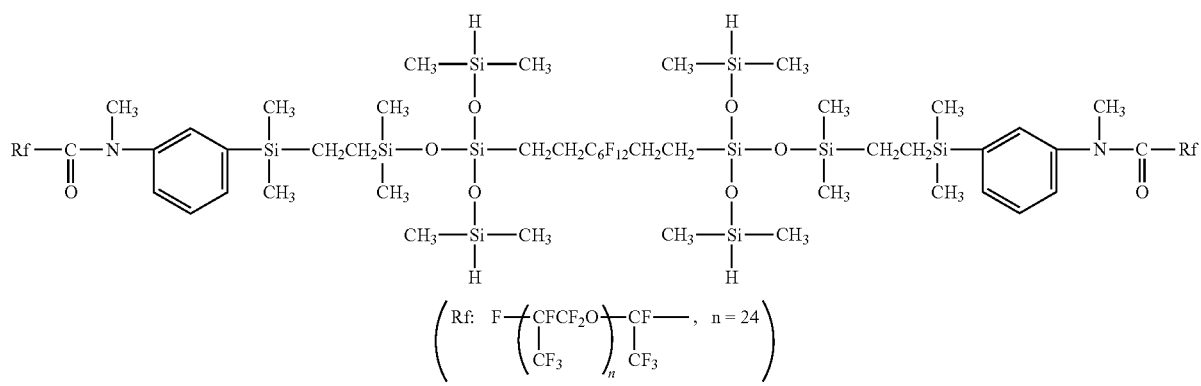
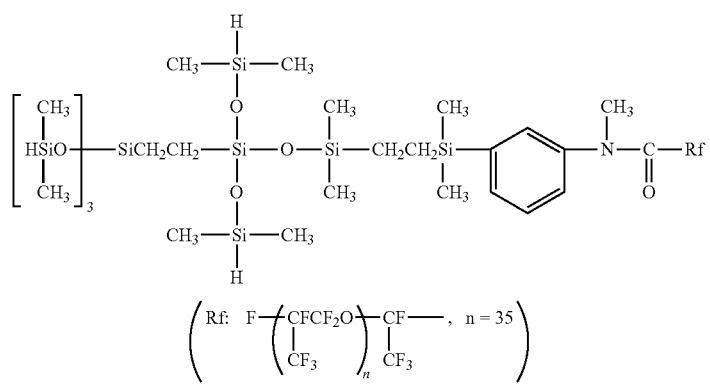
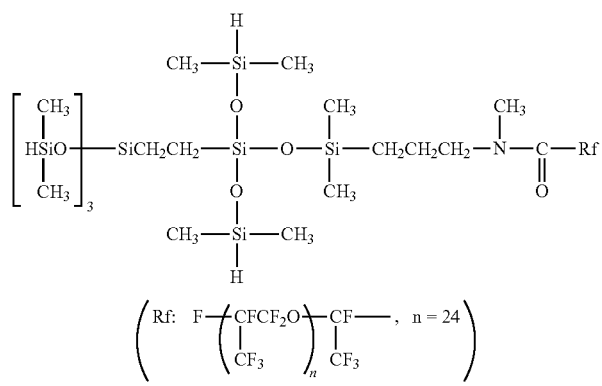
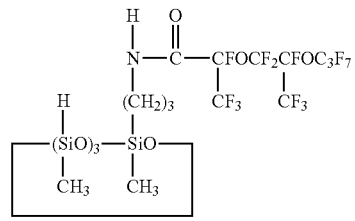
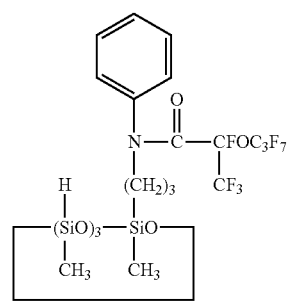
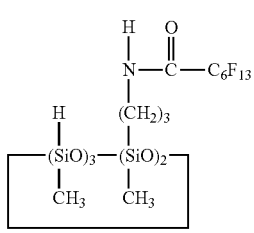
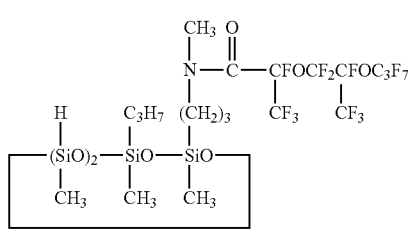
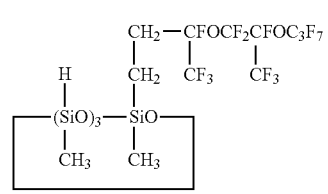
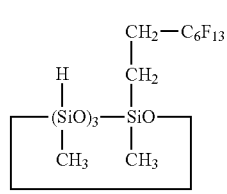
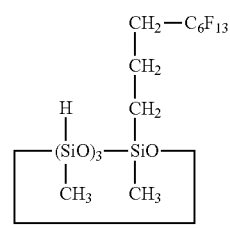

-continued
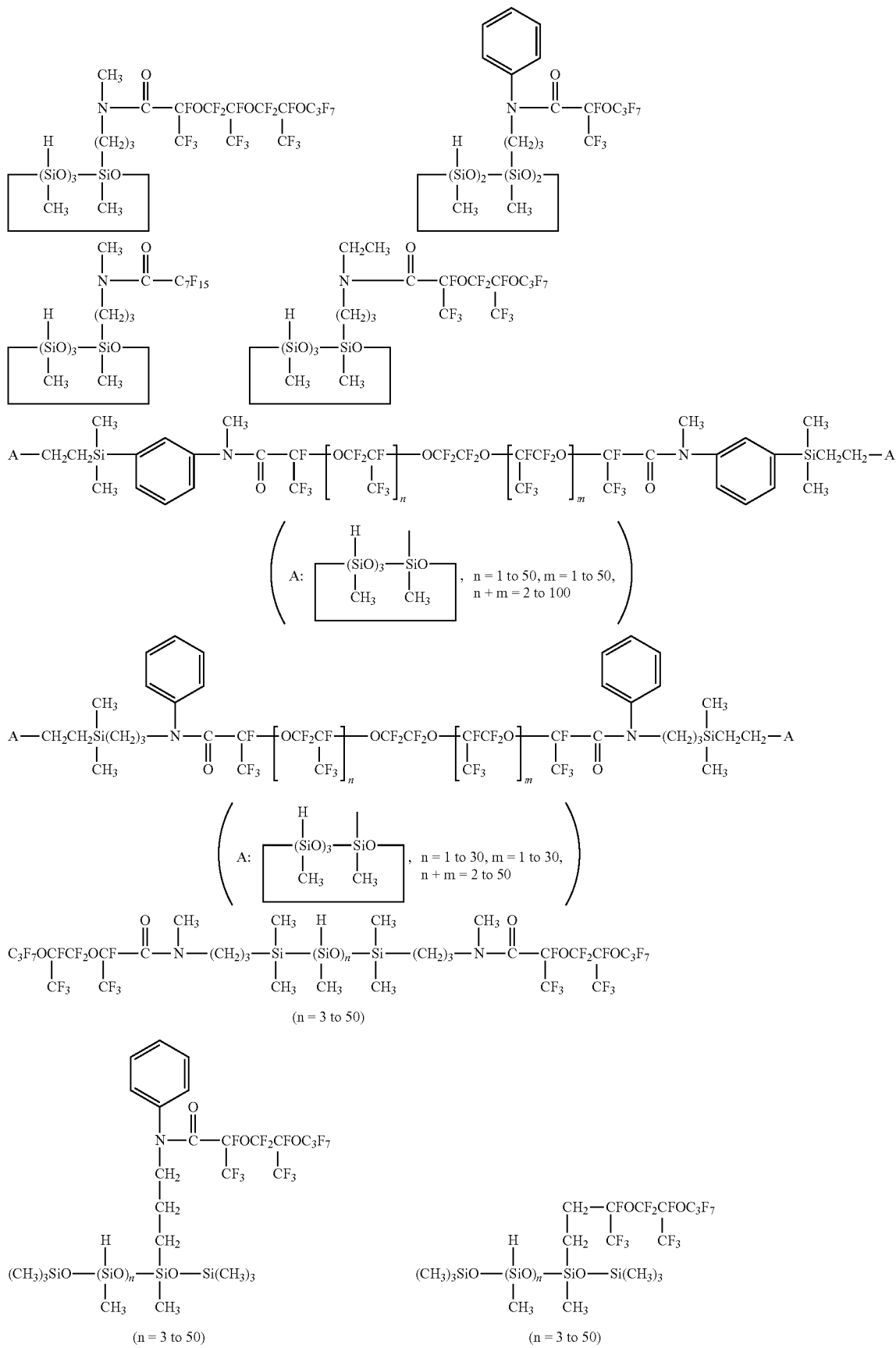

-continued
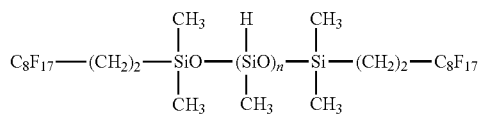
(n = 3 to 50)
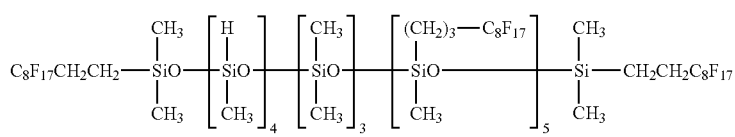
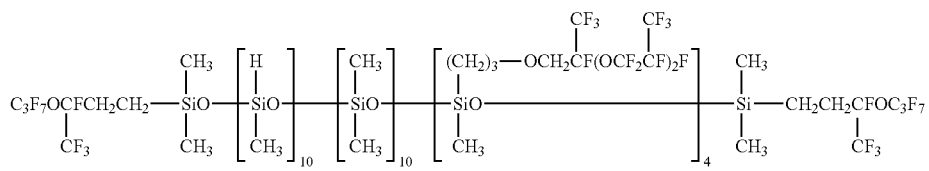
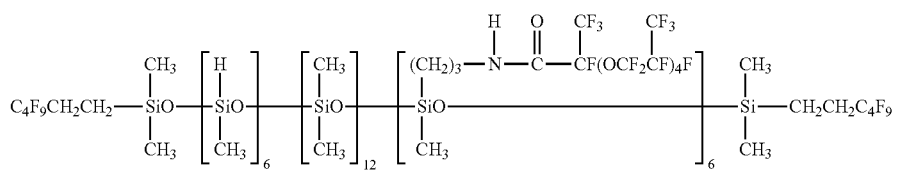
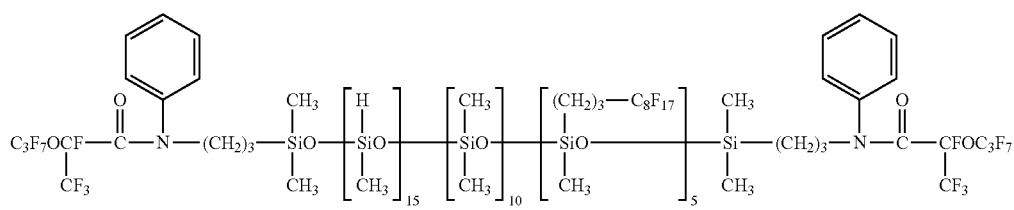
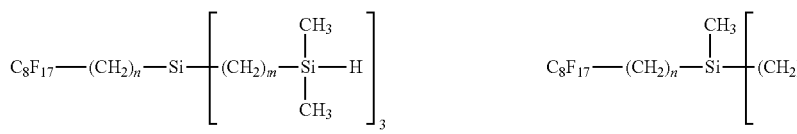
(n = 1 to 50, m = 1 to 50, n + m = 2 to 51)
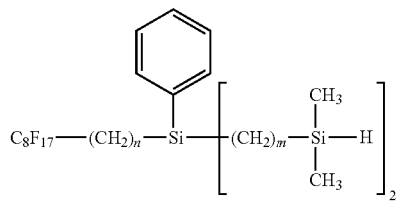
(m = 1 to 3, n = 1 to 8)
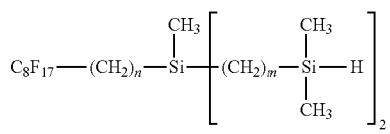
(m = 1 to 3, n = 1 to 8)
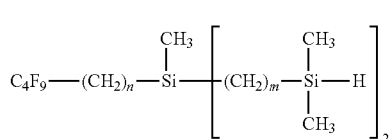
(m = 1 to 3, n = 1 to 8)
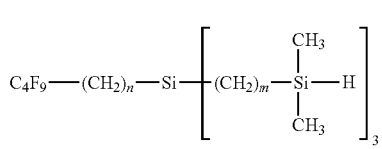
(m = 1 to 3, n = 1 to 8)
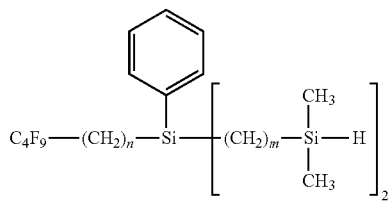
(m = 1 to 3, n = 1 to 8)
(m = 1 to 3, n = 1 to 8)

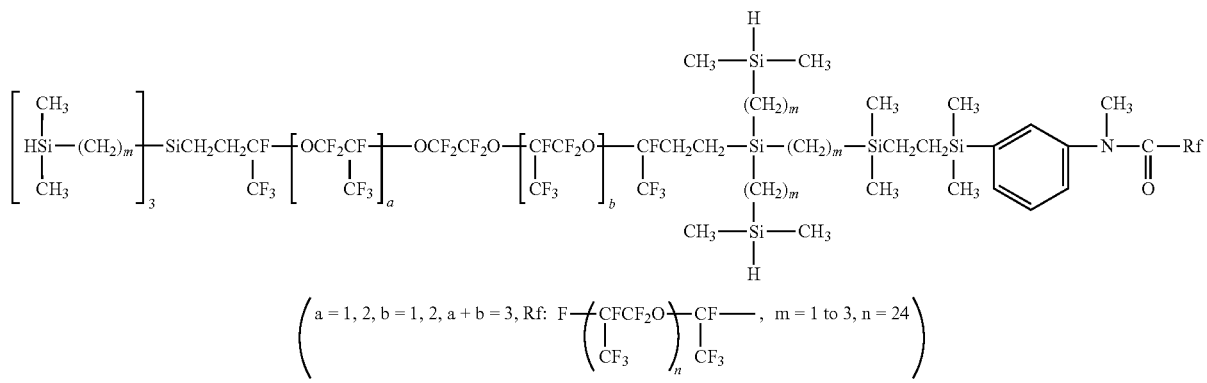
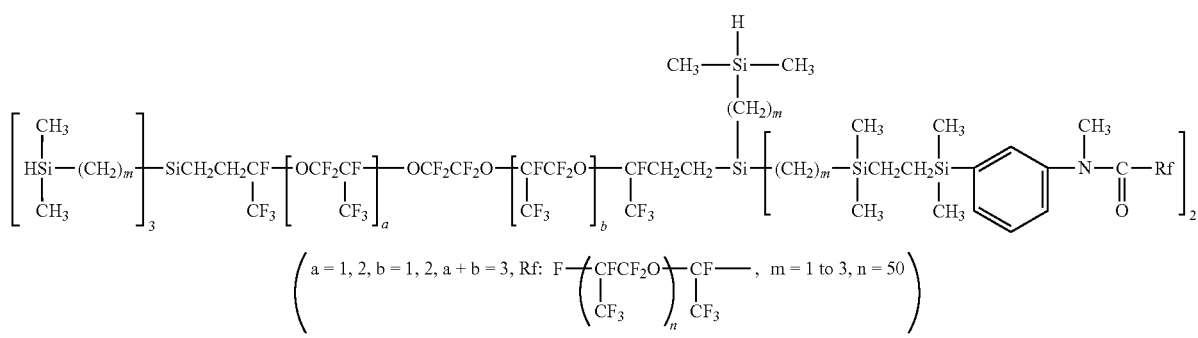
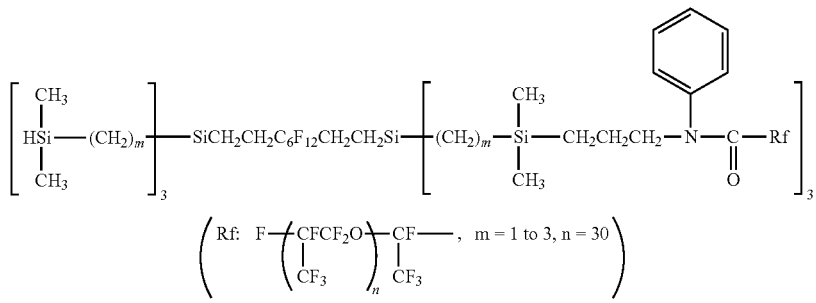
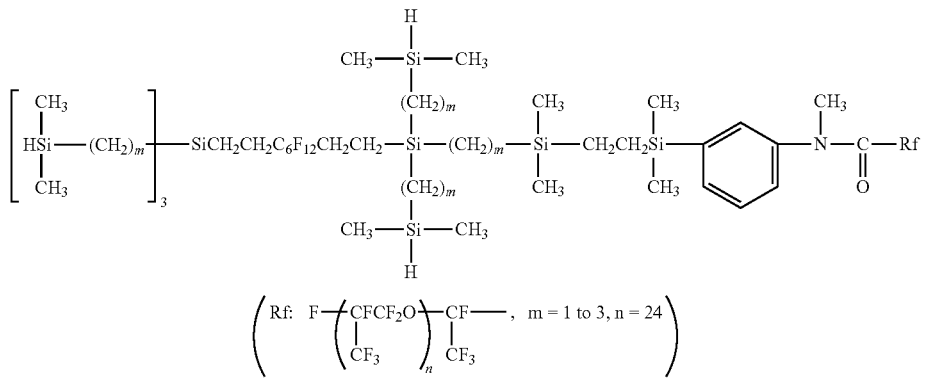

-continued
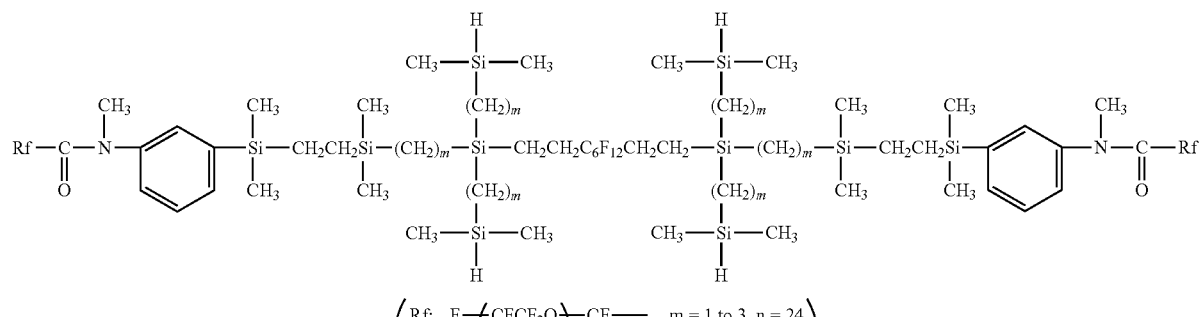
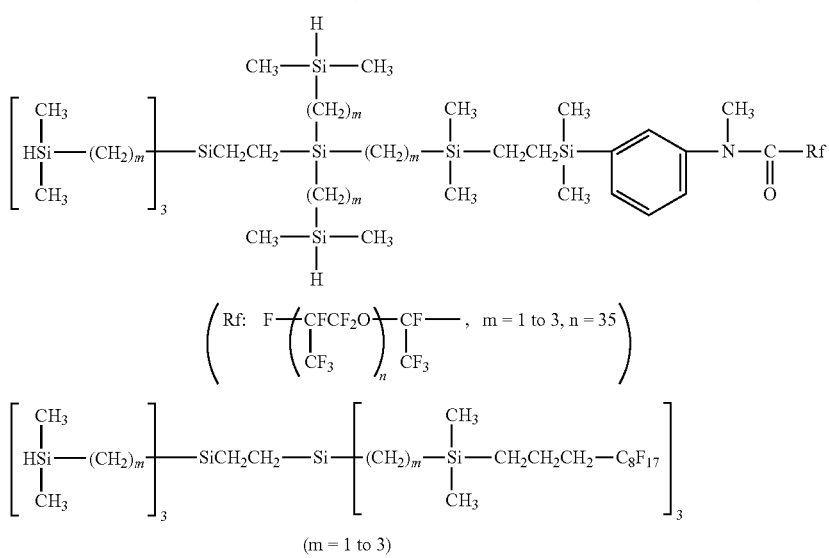
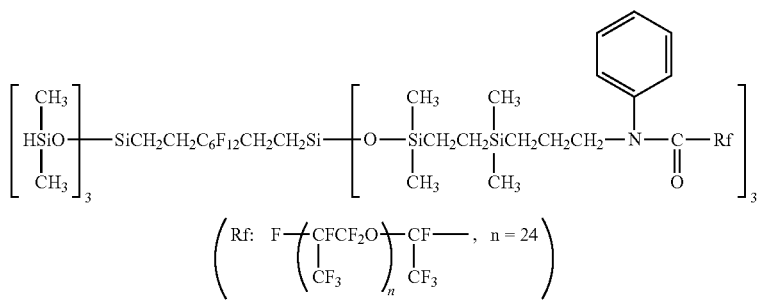
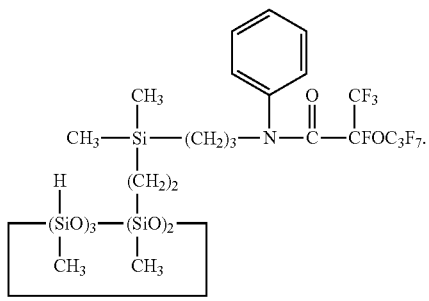

Of the compounds as mentioned above for the component (C), the non-limiting preferable organosilicon compounds are those described in JP 2990646 (Patent Document 2) and JP-A 2000-248166 (Patent Document 3).

Also preferred for the organosilicon compound of the organosilicon compound component (C) are those represented by the following general formula (10):

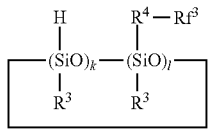 (10)

wherein $Rf^3$ is a monovalent perfluoroalkyl group or a monovalent perfluoropolyether structure-containing group, $R^3$ is a monovalent hydrocarbon group containing 1 to 20 carbon atoms, $R^4$ is a divalent hydrocarbon group containing 1 to 20, preferably 2 to 20 carbon atoms optionally containing ether bond, amide bond, carbonyl bond, or ester bond, k is an integer of at least 2, l is an integer of 1 to 6, and k+l is 3 to 10.

The monovalent perfluoroalkyl group and the monovalent perfluoropolyether structure-containing group $Rf^3$ in the formula (10) include those represented by the following general formulae.

Monovalent Perfluoroalkyl Group:

wherein b is an integer of 1 to 20, and preferably 2 to 10.

Monovalent Perfluoropolyether Structure-Containing Group:

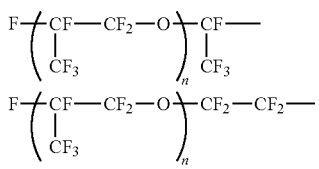

wherein n is an integer of 2 to 200, and preferably 2 to 100.

In the formula (10), $R^3$ is preferably a monovalent hydrocarbon group containing 1 to 20 carbon atoms, and more preferably 1 to 12 carbon atoms. Exemplary such groups include alkyl groups such as methyl group, ethyl group, propyl group, isopropyl group, butyl group, isobutyl group, tert-butyl group, pentyl group, hexyl group, octyl group, and decyl group, cycloalkyl groups such as cyclopentyl group, cyclohexyl group, and cycloheptyl group, alkenyl groups such as vinyl group, allyl group, propenyl group, isopropenyl group, butenyl group, and hexenyl group, aryl groups such as phenyl group, tolyl group, xylyl group, and naphthyl group, and aralkyl groups such as benzyl group, phenylethyl group, and phenylpropyl group, and of these, the preferred are those not having an aliphatic unsaturated bond.

$R^4$ is a divalent hydrocarbon group containing 1 to 20 carbon atoms which may be a divalent linking group optionally containing ether bond, amide bond, carbonyl bond, silyl group, or ester bond. Exemplary such linking groups include alkylene groups, arylene groups, combinations of such groups, or those further containing one or more of a ether bond oxygen atom (—O—), amide bond (—NRCO—), carbonyl bond (—CO—), and ester bond (—COO—). The preferred are those containing 2 to 12 carbon atoms. R in —NRCO— group is hydrogen atom, an alkyl group containing 1 to 4 carbon atoms, or phenyl group. Examples of $R^4$ include those represented by the following formulae:

—$CH_2CH_2$—,

—$CH_2CH_2CH_2$—,

—$CH_2CH_2CH_2$—O—$CH_2$—,

—$CH_2CH_2CH_2$—NH—CO—,

—$CH_2CH_2CH_2$—N(Ph)-CO—,

—$CH_2CH_2$—Si$(CH_3)_2$—$CH_2CH_2CH_2$—N(Ph)-CO—,

—$CH_2CH_2$—Si$(CH_3)_2$-Ph-N$(CH_3)$—CO—,

—$CH_2CH_2CH_2$—N$(CH_3)$—CO—, and

—$CH_2CH_2CH_2$—O—CO—, wherein Ph represents phenyl group.

The component (C) may be incorporated at an amount effective for curing the component (A) and the component (B). More specifically, the component (C) may be incorporated at an amount such that molar ratio of the hydrosilyl group (SiH group) in the component (C) in relation to 1 mole of the alkenyl group of the components (A) and (B) in the present composition is 0.2 to 2, and more preferably 0.5 to 1.5. When the content of the hydrosilyl group (SiH group) is too low, the crosslinking will be insufficient and the cured product may not be produced. Incorporation of too much component (C) is associated with the risk of foaming.

Component (D)

Component (D) of the present invention is a hydrosilylation catalyst which promotes addition of alkenyl groups in the component (A) and the component (B) with the hydrosilyl group in the component (C). A hydrosilylation catalyst is generally a compound of a noble metal which is expensive, and accordingly, use of platinum or a platinum compound for the hydrosilylation catalyst is preferable in view of the relatively high availability.

Examples of the platinum compound include chloroplatinic acid, a complex of chloroplatinic acid with an olefin such as ethylene, a complex of chloroplatinic acid with an alcohol or vinyl siloxane, and metal platinum loaded with silica, alumina, or carbon. Examples of the platinum group metallic compound other than the platinum compound include rhodium, ruthenium, iridium, and palladium compounds such as $RhCl(PPh_3)_3$, $RhCl(CO)(PPh_3)_2$, $Ru_3(CO)_{12}$, $IrCl(CO)(PPh_3)_2$, and $Pd(PPh_3)_4$ wherein Ph is phenyl group.

Content of the hydrosilylation catalyst is not particularly limited, and the hydrosilylation catalyst may be used at a catalytic amount. The hydrosilylation catalyst, however, may preferably be incorporated typically at 0.1 to 100 ppm in terms of the platinum group in relation to 100 parts by weight of total amount of the components (A), (B), (C), and (E).

Component (E)

The component (E) of the present invention is at least one perfluoropolyether compound selected from the group consisting of the compounds represented by the following general formulae (2) to (4):

 (2)

wherein A is a group represented by the formula: $C_eF_{2e+1}$— wherein e is an integer of 1 to 3, and d is an integer of 1 to 500,

 (3)

wherein A is as described above, and f and h are independently an integer of 1 to 300, and

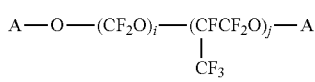

(4)

wherein A is as described above, and i and j are independently an integer of 1 to 300.

Addition of the perfluoropolyether compound of component (E) is optional. However, addition of this component enables production of a composition having improved chemical resistance, solvent resistance, and low-temperature properties with no adverse effects on the physical properties. In particular, when the component (E) is incorporated in a perfluoropolyether gel composition, the composition will have excellent low-temperature properties such as reduced glass transition temperature.

The component (E) is preferably used at 0.1 to 100 parts by weight, and most preferably at 0.5 to 50 parts by weight in relation to 100 parts by weight of the total of components (A) and (B). When used at an amount in excess of 150 parts by weight, bleeding may occur from the cured gel composition after prolonged period. The component (E) may comprise either a single compound or a combination of two or more compounds.

Other Components

In the present composition, various known additives may be added in addition to the components (A) to (E) as described above, and such additives may be added at an amount not adversely affecting the merits of the present invention. Exemplary additive include regulators for the hydrosilylation such as acetylene alcohols such as 1-ethynyl-1-hydroxycyclo-hexane, 3-methyl-1-butyn-3-ol, 3,5-dimethyl-1-hesyn-3-ol, 3-methyl-1-penten-3-ol, and phenylbutynol, 3-methyl-3-penten-1-in, and 3,5-dimethyl-3-hexen-1-in, as well as polymethylvinylsiloxane cyclic compound, and organophosphorus compound. Reactivity in the curing as well as storage stability will be maintained at an adequate level by the addition of such additives.

Another example of the additive is an inorganic filler. Exemplary inorganic fillers include powder of metal oxides such as iron oxide, zinc oxide, titanium oxide, calcium carbonate, magnesium carbonate, zinc carbonate, carbon black, fumed silica, wet silica, pulverized silica, diatomaceous earth, and alumina. Addition of such filler enables adjustment of hardness and mechanical strength of the cured product obtained by using the present composition. Other additives include ion-exchange resins such as hydrotalcite, hollow inorganic fillers, rubber spherical fillers.

These optional components may be added at any amount as long as the addition does not adversely affect the merits of the present invention.

Cured Product

The perfluoropolyether gel composition of the present invention can be cured and produced into a cured gel product (the so called "perfluoropolyether gel") which has excellent heat resistance, chemical resistance, solvent resistance, water repellency, oil repellency, weatherability, and the like, and in particular, excellent acid resistance. This gel product may be used in a variety of applications.

The cured product of the curable perfluoropolyether gel composition of the present invention can be formed by curing a composition containing 100 parts by weight of the component (A); 1 to 300 parts by weight of the component (B) in relation to 100 parts by weight of the component (A); component (C) at an amount such that the hydrosilyl group (SiH group) in the component (C) is 0.2 to 2.0 moles in relation to 1 mole of entire alkenyl group in the components (A) and (B); and component (D) at an amount of 0.1 to 100 ppm in terms of platinum in relation to the total amount of the components (A), (B), (C), and (E). In addition, the component (E) may be optionally added at an amount of 0 to 150 parts by weight of in relation to 100 parts by weight of the total of the components (A) and (B) for the purpose of, for example, reducing glass transition temperature.

The curing of the gel composition can be carried out by pouring the composition as described above in an adequate mold. More specifically, the composition may be coated on an adequate substrate and thereafter cured. The curing may also be accomplished by other known methods such as lamination. The curing is typically effected by heating to a temperature of 60 to 150° C. for about 30 to 180 minutes.

The thus obtained cured product of the gel composition can be used as a gel material having a penetration of 1 to 200 as measured by the consistency test using a ¼ cone according to JIS K2220 (or ASTM D-1403) and a glass transition temperature of up to −50° C.

The gel product produced by using the cured gel composition of the present invention is well adapted for use as a member in automobiles, chemical plants, ink jet printers, semiconductor production lines, analytical, physical, and chemical apparatus, medical instrument, aircrafts, fuel cells, and the like.

To be more specific, the gel product containing the cure product of the composition of the present invention is well adapted for use as a material for automobile parts, chemical plant parts, ink jet printer parts, parts in semiconductor production lines, parts in analytical, physical, and chemical apparatus, parts in medical instruments, moisture-proof coating agent for electro-electronic equipment, potting agent for sensors, sealants for fuel cells, and the like.

With regard to the use the composition of the present invention for a coating agent for electro-electronic equipment or potting agent for sensors, the preferred are use of the composition for gas pressure sensor, liquid pressure sensor, temperature sensor, humidity sensor, rotation sensor, G sensor, timing sensor, air flow meter, electronic circuit, semiconductor module, various control units, and the like.

When the cured product of the composition of the present invention is employed as a potting agent, coating agent, or the like, addition of a primer is useful for improving adhesion and bonding with the substrate. The primer is capable of preventing invasion of chemicals and solvents from the interface with the substrate, and therefore, improving the acid resistance, chemical resistance, and solvent resistance of the entire part.

Preferable primers include silane primers primarily comprising a silane coupling agent, primers primarily comprising an organohydrogen polysiloxane, primers primarily comprising a synthetic rubber, primers primarily comprising an acrylic resin, primers primarily comprising a urethane resin, and primers primarily comprising an epoxy resin.

In addition, the cured product of the composition of the present invention is preferably the one whose residual solid after immersing in conc. sulfuric acid (98%) under the conditions of 40° C. and 1,000 hours is at least 90%. When the residual solid is less than 90%, leakage form the sealed part as well as corrosion of the protected substrate or electro-electronic part may occur to detract from long term reliability. The acid resistance effect as demonstrated by the residual solid of at least 90% is typically realized by using the fluorine-containing polymer (A) having the particular molecular structure represented by the formula (1) in combination with the components (B) to (D), and optionally with the component (E) for the base polymer of the gel composition.

EXAMPLES

Next, the present invention is described in further detail by referring to Examples and Comparative Example, which by no means limit scope of the present invention.

Examples 1 and 2 and Comparative Example 1

Perfluoropolyether gel compositions shown in Table 1 were prepared by using the following materials.

Polymer A:

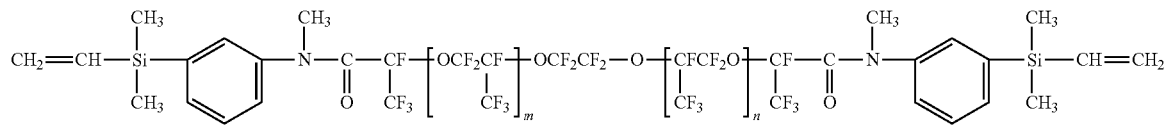

wherein average of m+n is 95.

Polymer B:

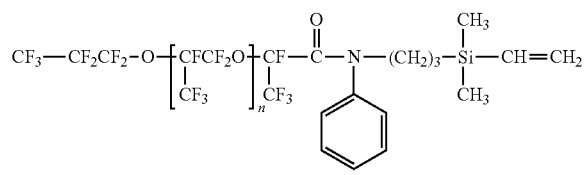

wherein average of n is 23.

Polymer C:

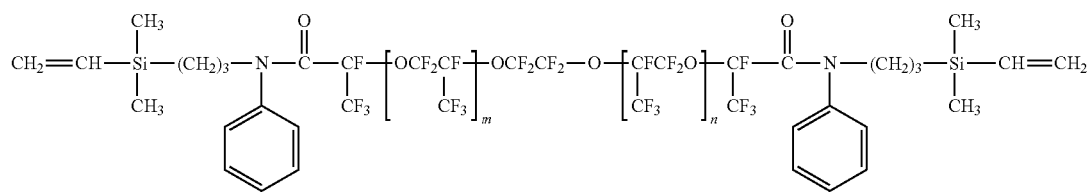

wherein average of m+n is 97.

Polymer D:

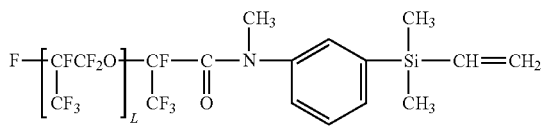

wherein L is 24.

Polymer E:

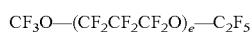

$CF_3O-(CF_2CF_2CF_2O)_e-C_2F_5$ wherein e is 27.

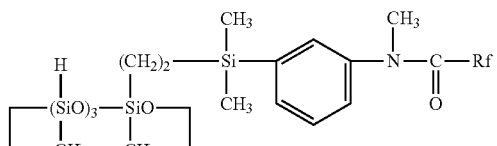

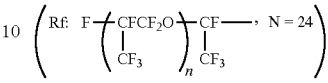

Curing Catalyst:
A solution in toluene of platinum—divinyl tetramethyl disiloxane complex (platinum content, 0.5%).

Curing Regulator:
A 50% toluene solution of ethynylcyclohexanol.

Each of the thus prepared gel composition was cured under the conditions of 150° C. and 1 hour, and hardness (penetration) was measured by the procedure according to JIS K2220. Acid resistance test was also conducted by the procedure as described above. The results are shown in Table 1.

Acid Resistance Test (Weight Change)
A glass container of 32 mm (diameter)×15 mm was filled with 20 g of the composition of Examples and Comparative Examples, and the composition was cured under the conditions of 150° C. and 1 hour to prepare a sample. The sample was immersed in 98% conc. sulfuric acid at 40° C. for 1,000 hours, and weight change before and after the immersion was evaluated.

Acid Resistance Test (Change in Physical Properties)
A glass container of 32 mm (diameter)×15 mm was filled with 20 g of the composition of Examples and Comparative Examples, and the composition was cured under the conditions of 150° C. and 1 hour to prepare a sample. The sample was immersed in 98% conc. sulfuric acid at 40° C. for 1,000 hours, and penetration before and after the immersion was evaluated.

Acid Resistance Test (Appearance)
A glass container of 32 mm (diameter)×15 mm was filled with 20 g of the composition of Examples and Comparative Examples, and the composition was cured under the conditions of 150° C. and 1 hour to prepare a sample. The sample was immersed in 98% conc. sulfuric acid at 40° C. for 1,000 hours, and appearance after the immersion was evaluated by the following criteria:
○: no change
Δ: small change (partial dissolution)
×: large change (total dissolution)

TABLE 1

|  |  | Example 1 | Example 2 | Comparative Example 1 |
|---|---|---|---|---|
| Components (part by weight) | Polymer A | 73 | 56 |  |
|  | Polymer B | 27 | 19 |  |
|  | Polymer C |  |  | 71 |
|  | Polymer D |  |  | 29 |
|  | Polymer E |  | 25 |  |
|  | Curing catalyst | 0.12 | 0.12 | 0.12 |
|  | Curing regulator | 0.12 | 0.12 | 0.12 |
|  | Hydrogensiloxane | 25.4 | 18.7 | 25.0 |
| Penetration (at 150° C., 1 hour after the heating) |  | 71 | 69 | 67 |
| Acid resistance test (40° C., 1,000 hours) | Weight change | 0% | 0% | −59% |
|  | Penetration | 70 | 68 | Not measurable |
|  | Outer appearance | ○ | ○ | Δ |

Japanese Patent Application No. 2010-159359 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable perfluoropolyether gel composition, comprising
(A) a straight chain fluorine-containing polymer having at least two alkenyl groups per molecule, represented by formula (1):

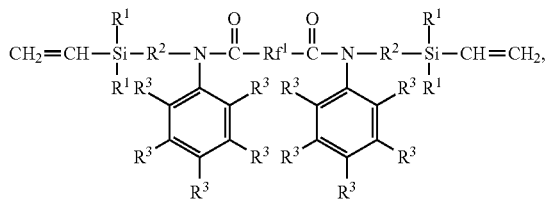

(1)

wherein $R^1$ is independently a vinyl group or an alkyl group containing 1 to 4 carbon atoms, $R^2$ is an alkylene group containing 1 to 6 carbon atoms, $R^3$ is independently a hydrogen atom or an alkyl group containing 1 to 4 carbon atoms optionally substituted with fluorine, and $Rf^1$ is a perfluoroalkylene group or a divalent perfluoropolyether structure-containing group;
(B) a polyfluoromonoalkenyl compound containing one alkenyl group per molecule and having a perfluoropolyether structure in its backbone;
(C) an organosilicon compound containing at least two hydrogen atoms bonded to the silicon atom per molecule; and
(D) a hydrosilylation catalyst.

2. A curable perfluoropolyether gel composition according to claim 1, further comprising
(E) a at least one perfluoropolyether compound selected from the group consisting of: a compound represented by formula (2):

wherein A is a group represented by the formula: $C_eF_{2e+1}$— wherein e is an integer of 1 to 3, and d is an integer of 1 to 500;
a compound represented by formula (3):

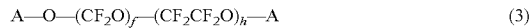

wherein A is as described above, and f and h are independently an integer of 1 to 300; and
a compound represented by formula (4):

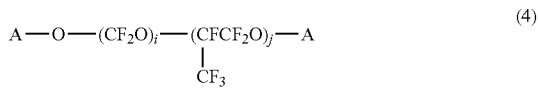

wherein A is as described above, and i and j are independently an integer of 1 to 300.

3. A curable perfluoropolyether gel composition according to claim 1, wherein a cured product of said gel composition exhibits a penetration according to JIS K2220 or ASTM D-1403 in the range of 1 to 200.

4. A curable perfluoropolyether gel composition according to claim 1, wherein an amount of a cured product of said gel composition remaining in solid state after immersing in concentrated 98% sulfuric acid at 40° C. for 1,000 hours is at least 90%.

5. A gel product, containing a cured product of a curable perfluoropolyether gel composition according to claim 1.

6. A gel product according to claim 5, wherein said product is adapted for use in automobiles, chemical plants, ink jet printers, semiconductor production lines, physical and chemical analysis equipment, medical equipment, aircrafts, or fuel cell production.

7. A curable perfluoropolyether gel composition according to claim 1, wherein said perfluoropolyether structure-containing group is represented by formula (5):

wherein g is an integer of 1 to 6, q is an integer of 20 to 600.

8. A curable perfluoropolyether gel composition according to claim 1, wherein said perfluoropolyether structure-containing group is represented by formula (5):

wherein g is an integer of 1 to 6, q is an integer of 30 to 400.

9. A curable perfluoropolyether gel composition according to claim 1, wherein said perfluoropolyether structure-containing group is represented by formula (5):

wherein g is an integer of 1 to 6, q is an integer of 30 to 200.

10. A curable perfluoropolyether gel composition according to claim 1, wherein said divalent perfluoropolyether structure-containing group contains a structure selected from the group consisting of:

a group represented by formulae (6):

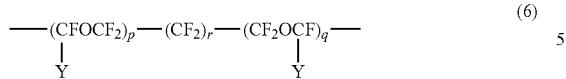 (6)

wherein Y is fluorine atom or trifluoromethyl group, p, q, and r are independently an integer of p≧0, q≧0, 0≦p+q≦200 and most preferably 2≦p+q≦150, and 0≦r≦6 excluding the case of p=q=r=0;

a group represented by formula (7):

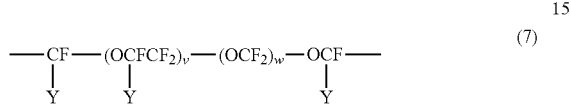 (7)

wherein Y is fluorine atom or trifluoromethyl group, and v and w are independently an integer of 1≦v≦20 and 1≦w≦20; and a group represented by formula (8):

 (8)

wherein z is an integer of 1 <z <100.

11. A curable perfluoropolyether gel composition according to claim 1, wherein said divalent perfluoropolyether structure-containing group contains a structure represented by formulae (6):

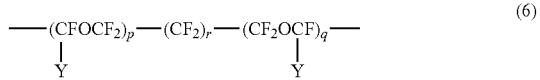 (6)

wherein Y is fluorine atom or trifluoromethyl group, p, q, and r are independently an integer of p≧0, q≧0, 0≦p+q≦200 and most preferably 2≦p+q≦150, and 0≦r≦150, and 0≦r≦6 excluding the case of p=q=r=0.

12. A curable perfluoropolyether gel composition according to claim 1, wherein said divalent perfluoropolyether structure-containing group contains a structure represented by formula (7):

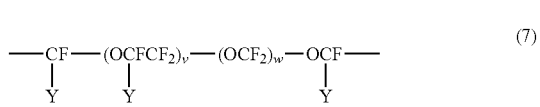 (7)

wherein Y is fluorine atom or trifluoromethyl group, and v and w are independently an integer of 1≦v≦20 and 1≦w≦20.

13. A curable perfluoropolyether gel composition according to claim 1, wherein said divalent perfluoropolyether structure-containing group contains a structure represented by formula (8):

 (8)

wherein z is an integer of 1≦z≦100.

14. A curable perfluoropolyether gel composition according to claim 1, wherein said straight chain fluorine-containing polymer represented by formula (1) is a compound represented by one of the following formulae:

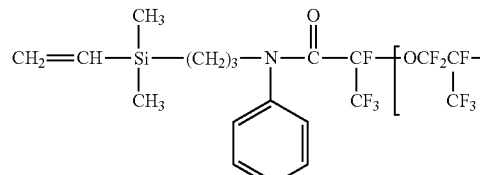

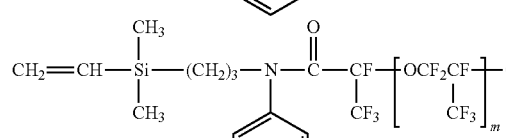

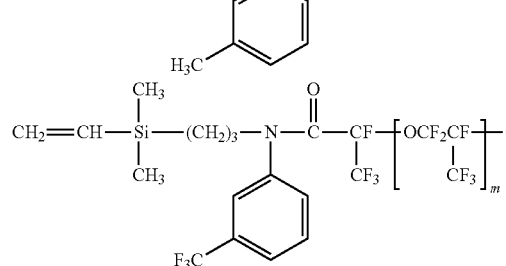

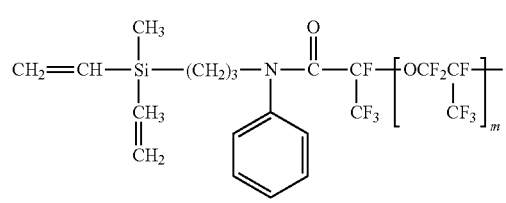

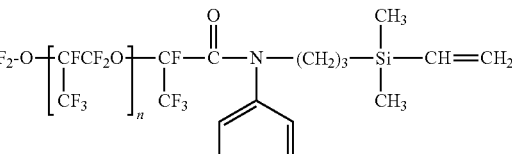

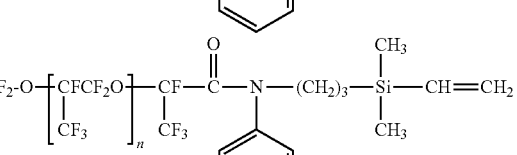

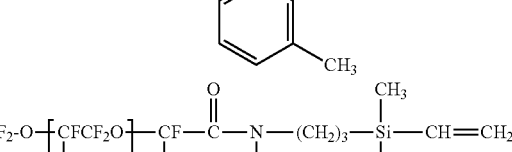

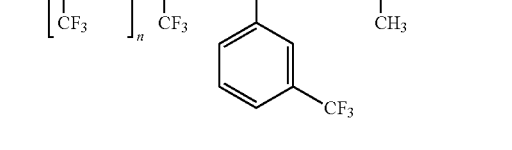

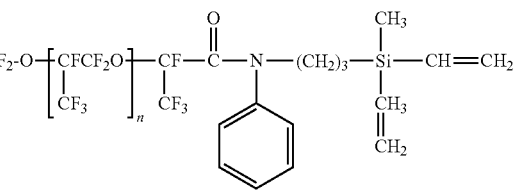

wherein m is 1 to 100, n is 1 to 100, and m+n is 2 to 200.

15. A curable perfluoropolyether gel composition according to claim 1, wherein said polyfluoromonoalkenyl compound (B) is a compound represented by formula (9):

wherein
X' is —CH₂—, —OCH₂—, —CH₂OCH₂—, or —CO—NR⁴—Y'— wherein Y' is —CH₂—, a o—, m— or p—dimethylsilylphenylene group represented by formula (Z'):

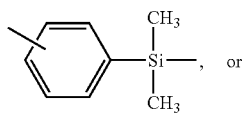

a group represented by 1 formula (Z'):

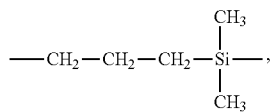

R⁴ is hydrogen atom, methyl group, phenyl group, or allyl group;
Rf² is a monovalent perfluoropolyether structure-containing group represented by the following formula:

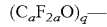

wherein a is an integer of 1 to 6, and q is an integer of 20 to 600; and
p is 0 or 1.

16. A curable perfluoropolyether gel composition according to claim 15, wherein Rf² is represented by one of the following formulae:

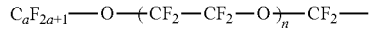
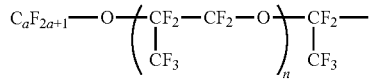
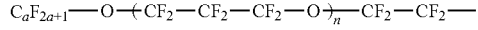
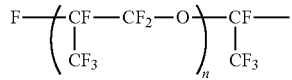

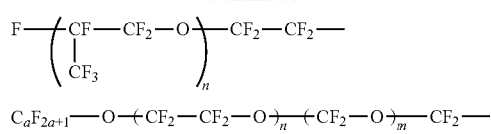

wherein a is an integer of 1 to 8, and n is an integer of 0≦n≦100.

17. A curable perfluoropolyether gel composition according to claim 1, wherein said polyfluoromonoalkenyl compound (B) is represented by one of the following formulae:

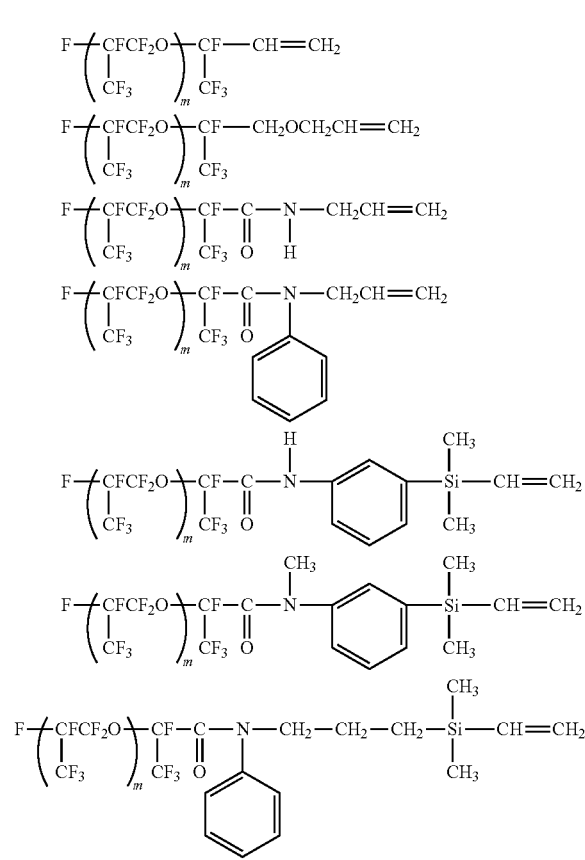

wherein m =1 to 100.

* * * * *